United States Patent [19]

Hackett et al.

[11] Patent Number: 4,486,872
[45] Date of Patent: Dec. 4, 1984

[54] IN-ARM STYLUS CLEANER FOR DISC RECORD PLAYER

[75] Inventors: Charles F. Hackett, Indianapolis; Eric A. Brauer, Danville; Kevin C. Kelleher, Plainfield; Richard R. Wright, Indianapolis, all of Ind.

[73] Assignee: RCA Corporation, New York, N.Y.

[21] Appl. No.: 426,009

[22] Filed: Sep. 28, 1982

[51] Int. Cl.³ .............................................. G11B 3/58
[52] U.S. Cl. .................................................... 369/71
[58] Field of Search .......................................... 369/71

[56] References Cited

FOREIGN PATENT DOCUMENTS 55-28570  2/1980  Japan ..................................... 369/71

Primary Examiner—Steven L. Stephan
Attorney, Agent, or Firm—Paul J. Rasmussen; William H. Meise; Dilip A. Kulkarni

[57] ABSTRACT

The in-arm stylus cleaner includes a cleaner arm mounted for to-and-fro motion in the stylus arm carriage. To clean the stylus, the cleaner arm is retracted, the reproducing stylus is raised back up into the carriage arm, the cleaner arm is freed to allow a wiping element mounted thereon to sweep the stylus tip, and the stylus is then gently lowered onto a turntable-disposed record to resume playback operations.

6 Claims, 7 Drawing Figures

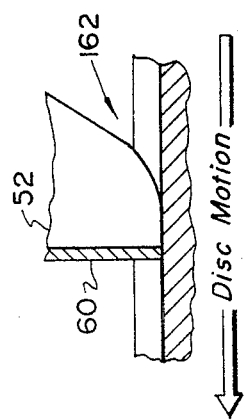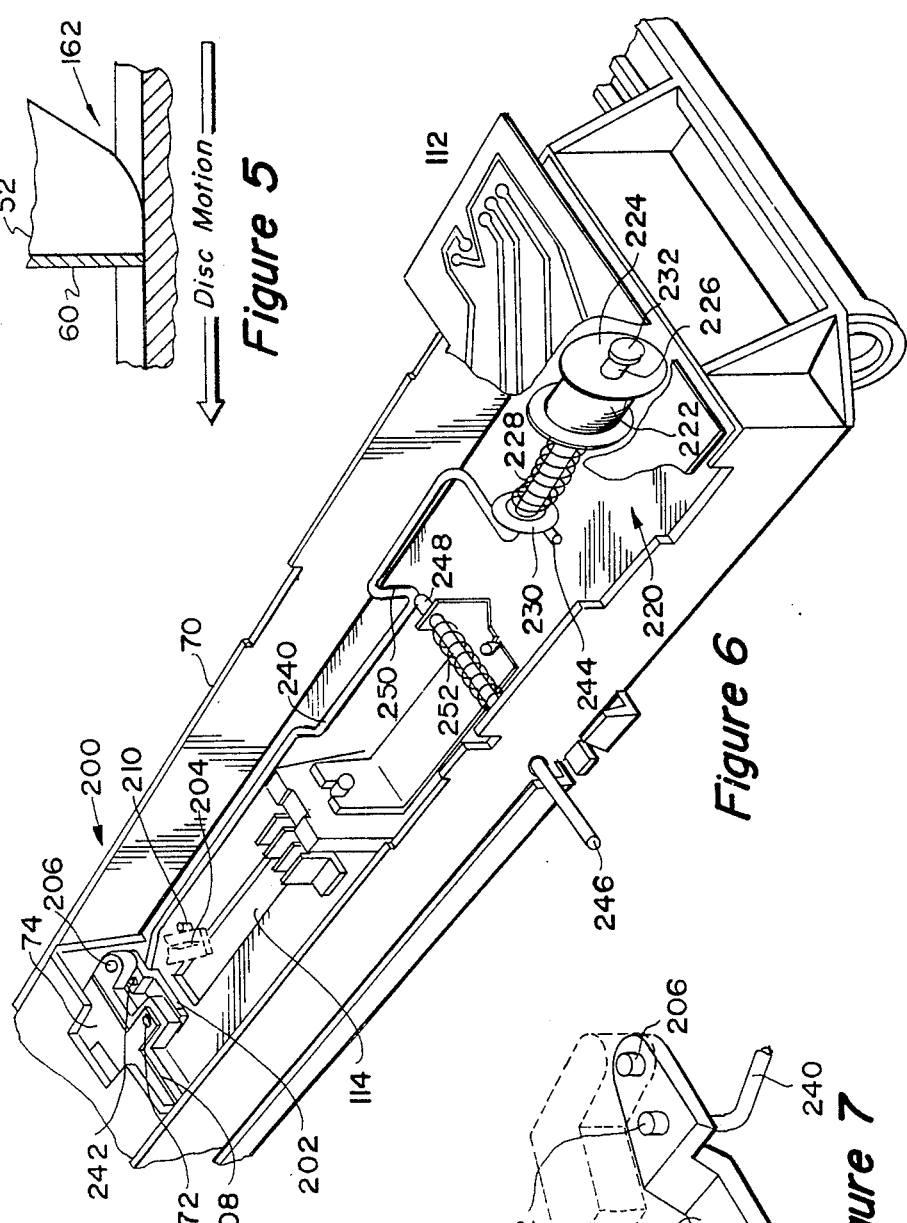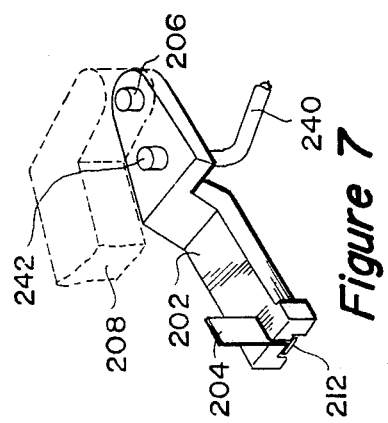

IN-ARM STYLUS CLEANER FOR DISC RECORD PLAYER

The present invention generally relates to a system for automatically cleaning a reproducing stylus in a record player and, more particularly, to a stylus cleaning system housed in a stylus arm carriage.

There are several applications where it is desirable to automatically clean the stylus tip to get rid of accumulated dust and debris which might otherwise obscure the desired signal recovery. Such applications may arise in the context of audio and audio-video systems for recovering information recorded on a disc record medium.

One such application is the capacitive type video disc system. Here, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In the video disc systems, the information track density is generally quite high. For example, one commercially available system uses a spirally-grooved information track with a groove density of nearly 10,000 grooves per inch (groove width = approximately 2.5 micrometers). During playback, the stylus tip is received in the groove and guided toward the record center as a turntable-supported record revolves at the desired speed. The microscopic groove geometries require a stylus that has rather fine dimensions (e.g., stylus tip width = 2 micrometers, stylus tip length = 5 micrometers and stylus tip height = 3 micrometers). It is generally the practice with such high density records (both grooved and flat records) to mount the signal recovery stylus in a protective cartridge which, in turn, is installed in a translatable carriage. The bottom wall of the carriage has an elongated aperture through which the stylus is selectively lowered onto a turntable-supported record. The carriage is driven to cause it to follow the radially inward motion of the groove-guided stylus. Typically, a mechanism to lift and lower the stylus to effect stylus/record disengagement and engagement is located in the carriage. See, for example, U.S. Pat. No. 4,266,785 which issued to T. W. Burrus on May 15, 1981.

It is also known that the signal-to-noise ratio, or, more generally, the quality of the recovered signal is affected by such things as microscopic dust and debris adhering at the base of the pickup stylus or under the stylus shoe. The dust referred to here can come from the atmosphere. The debris, on the other hand, can come out of the information track as the stylus rides in the record groove.

In video disc players, it is advantageous to provide the ability to quickly locate a precise segment of the prerecorded program on a disc. To this end, the player is subject to disposition in one of four search modes—i.e., visual search (forward/backward) and rapid access (forward/backward). In visual search, the stylus is rapidly swept across the record while in engagement therewith (at 16 times the normal playback speed). In rapid access, the stylus is rapidly moved sideways while in engagement with the record at a much greater speed (at 120 times the normal playback speed). During high speed visual search, there is a potential for a buildup of dust and debris around the stylus to the extent that the stylus shoe is physically separated from the record, causing degradation or even loss of signals at the output of the stylus. The loss of signals at the stylus output is sometimes referred to as a "carrier distress" problem.

It is desirable to free the stylus of accumulated dust and debris as indicated before. In U.S. Pat. No. 4,285,524 issued to Hughes on Aug. 25, 1981, a system is disclosed for cleaning a stylus each time a record is recovered from the player. As described in Hughes et al. application, each time an empty protective cover is inserted into the player and subsequently withdrawn therefrom with the record enclosed, the stylus is momentarily lowered and a stylus cleaning pad swings by the lowered stylus to wipe off any dust or debris.

In a concurrently-filed, commonly-assigned U.S. patent application Ser. No. 426,008, of Hughes now U.S. Pat. No. 4,450,548 another stylus cleaning mechanism is disclosed. In the therein disclosed system, the stylus is momentarily lowered onto a stylus wiping pad every time the carriage is driven toward an off-record home position, and then driven back toward the record for playback.

In a video disc player fitted with a stylus cleaning mechanism of the type mentioned above, it is possible to clean the stylus when carrier distress or other disturbances occur by recycling the caddy in and out of the player, or by returning the carriage to the rest position off the edge of the record and then driving it back toward the record. The operator must subsequently relocate the section of the prerecorded material previously seen before the incidence of the carrier distress to resume playback.

The subject invention makes it possible to rid the stylus of the dust and debris accumulated thereon during playback without the need for recycling the caddy or the carriage. In accordance with the present invention, the stylus cleaner is mounted in the stylus arm carriage, so that whenever a carrier distress condition occurred, the stylus can be simply raised, cleaned and lowered to resume the playback. The instant stylus cleaner includes a stylus wiping element holder mounted in the carriage for a to-and-fro motion between an advanced position and a retracted position. The player further includes a selectively-actuated sequencing means, which when activated, retracts the holder when the stylus is down, raises the stylus, releases the holder to return to the original position while the stylus is up to permit a holder-mounted wiping element to clean the raised stylus, and then lowers the stylus to resume playback operations.

In the Drawings:

FIG. 5 illustrates the stylus/record interface;

FIG. 6 depicts an enlarged perspective view of the instant in-arm stylus cleaner, and FIG. 7 portrays the stylus cleaner arm assembly.

Figure 1:
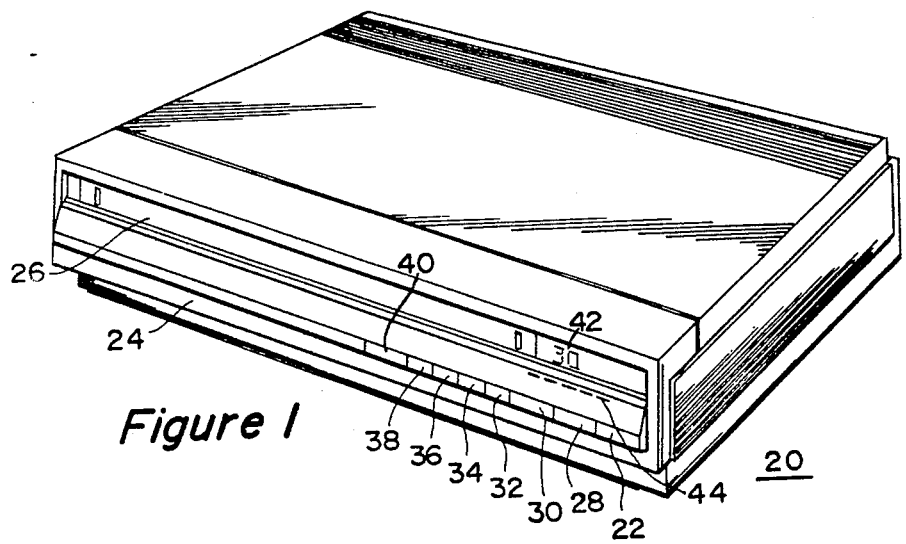
FIG. 1 is a perspective view of a video disc player utilizing an in-arm stylus cleaner of the present invention.

Shown in FIG. 1 is a video disc player 20 incorporating the present in-arm stylus cleaning mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO- are indicated by a plurality of light indicators 44.

Figure 2:
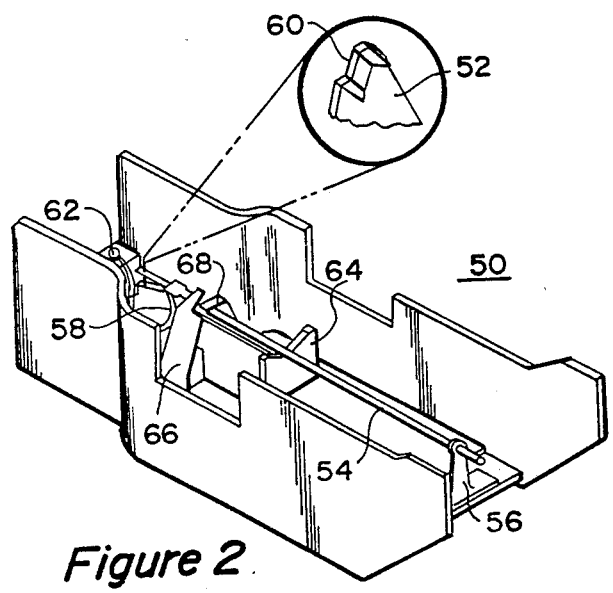
FIG. 2 illustrates a perspective view of a stylus cartridge suitable for use with the subject invention, and shown in an inverted position to illustrate the construction details.

FIG. 2 is a perspective view of a stylus cartridge 50, shown upside-down to reveal its construction. The cartridge 50 comprises a stylus 52 firmly secured at one end of an elongated, tubular stylus arm 54. The other end of the stylus arm 54 is flexibly suspended in the cartridge enclosure by a thin compliant suspension 56. The stylus tip is about 2 micrometers wide, 5 micrometers deep and 3 micrometers high. The stylus arm 54 is in the form of a hollow aluminum tube with the following dimensions: length=1.654 inches, outside diameter=0.044 inches and inside diameter=0.040 inches. A leaf spring or flylead 58 is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back within the confines of the cartridge housing against a stop 64 by a set of retaining fingers 66 and 68. When the cartridge 50 is installed in the player, the retaining springs 66 and 68 are automatically spread apart to release the stylus arm 54

Figure 3:
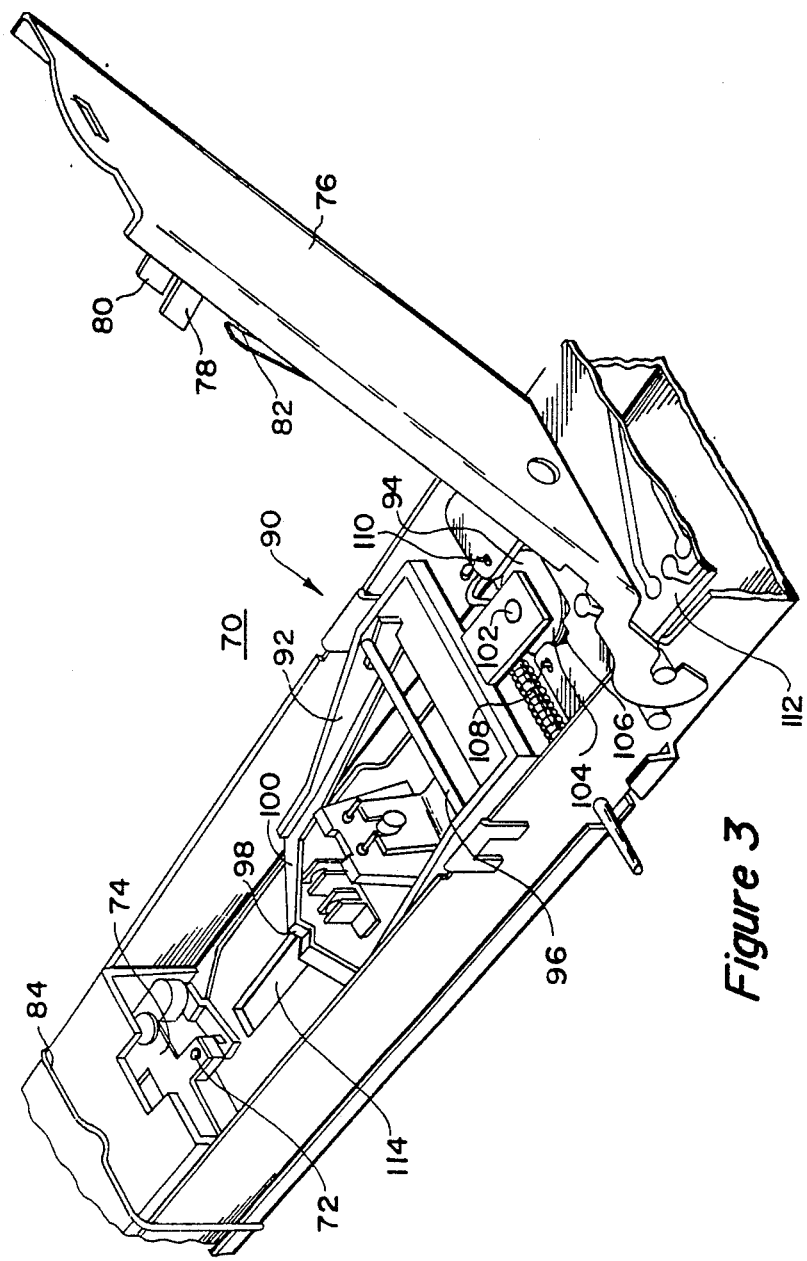
FIG. 3 represents an isometric view of a carriage arm translatably mounted in the FIG. 1 player in which the subject in-arm stylus cleaner is located.

The stylus cartridge 50 is installed in a carriage 70 shown in FIG. 3. The carriage 70 is translatably mounted in the player in the manner described later. The terminal 62 disposed on the cartridge case engages an input terminal 72 of the pickup electronics 74 housed in the carriage 70 upon reception of the cartridge therein. The carriage lid 76 is fitted with a pair of depending tabs 78 and 80, which engage and spread apart the stylus arm retaining springs 66 and 68 to free the stylus arm 54 when the carriage lid is closed. A leaf spring 82 arranged on the underside of the carriage lid 76 holds the cartridge 50 in place. A wire hoop 84 is provided to lock the carriage lid 76.

The carriage 70 is further equipped with a stylus lifting/lowering device 90 comprising a pivotally-mounted, stylus arm bracket 92 and a selectively-actuated electromagnet 94. The stylus arm bracket 92 is swingably mounted in the carriage 70 about a cross rod 96. When the cartridge 50 is positioned in the carriage 70 and the lid 76 is locked shut, the stylus arm 54 comes to rest in a raised position in a centering depression 98 provided on the cross member 100 of the stylus arm bracket 92. Depending downwardly from the other side of the stylus arm bracket 92, and fixedly secured thereto, is a permanent magnet 102. The permanent magnet 102 has a portion extending into an air gap defined by a non-magnetic core 104 of the electromagnet 94. Disposed about the core 104 is an electrical winding 106 having a pair of terminals 108 and 110 connected to an energization means 112. In the normal condition—i.e., in the absence of signals applied to the electromagnet 94—, the distribution of the weight of the stylus arm bracket 92 is such that the stylus arm 54 is held in the lifted position. When an appropriate signal is applied to the terminals 108 and 110, the bracket-mounted magnet 102 is repelled out of the air gap of the electromagnet to slowly set the stylus 52 down. The energization means 112, when actuated, applies a particular form of signal to the electromagnetic device 90 to assure a gentle stylus set down. The bottom wall of the carriage 70 has an elongated opening 114 to permit the stylus 52 to pass out of the confines of the carriage when the stylus lifting/lowering mechanism 90 is activated.

As will be evident from the brief description of the operation of the video disc player, there are several modes of operation in which the stylus 52 is lowered or lifted. For example, the stylus lifting/lowering device 90 is activated to lower the stylus 52 on a turntable-supported disc for playback, or on a wiping pad for cleaning the stylus tip. The signals are removed from the terminals 108 and 110 of the electromagnet coil 106 to raise the stylus 52 back up into the carriage 70 when the player is set in the PAUSE or OFF modes.

Figure 4:
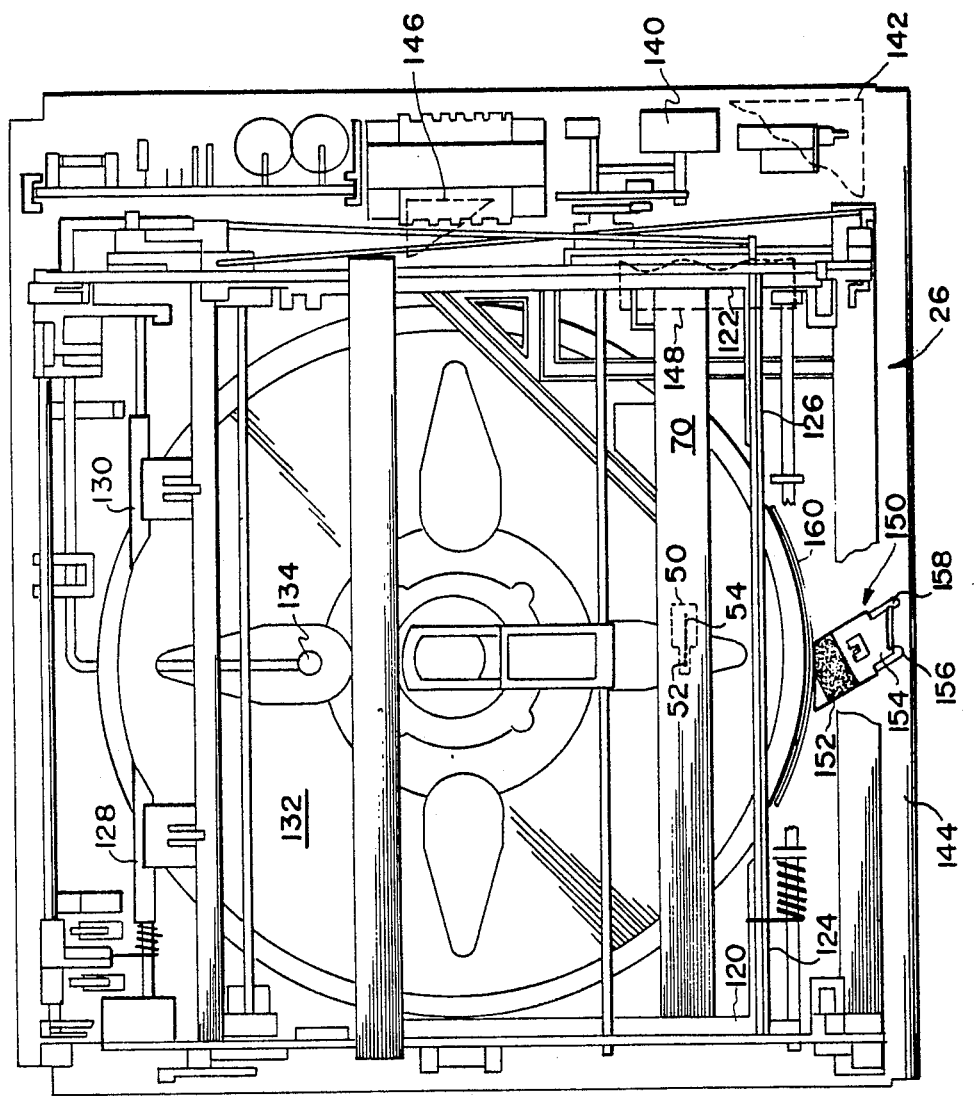
FIG. 4 shows a top view of the video disc player of FIG. 1 with its cover removed to show the underlying details.

Referring to FIG. 4, the pickup carriage 70 is mounted in the player for motion between an off-record rest position and an on-record, end-of-play position along a path defined by a pair of guide rails 120 and 122. A record is loaded into the player by inserting a full caddy into the player. Upon the extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, now U.S. Pat. No. 4,439,852, and entitled "DISC PLAYER HAVING RECORD HANDLING APPARATUS", describes a suitable record extraction and transfer mechanism.

A stepper motor 140 drives the carriage 70 from the off-record rest position to a starting position over the turntable-supported record, and the stylus arm lifting/lowering device 90 is energized to lower the stylus 52 onto the record. During playback, the carriage 70 is driven toward the record center so as to cause it to track the radially-inward motion of the stylus 52. The signals at the output of the reproducing stylus 52 are processed by the pickup circuits 74 housed in the carriage 70, and fed to signal processing circuitry disposed on a signal board 142 attached to the centerplate 144 of the player. The signal processing circuitry converts the signals at the output of the pickup circuits 74 into a form suitable for application to a conventional television receiver. When the carriage 70 reaches the end-of-play position, the stylus 52 is raised and the carriage is driven back until it operates a microswitch to reset it at its off-record rest position. The record is automatically transferred back to the record receiving pads 124, 126, 128 and 130. The record is then retrieved from the player by inserting an empty sleeve into the player and withdrawing it therefrom.

Disposed on the signal board 142 are two microcomputers—a mechanism microcomputer 146 and a player control microcomputer 148. The mechanism microcomputer 146 is responsible for sequencing and controlling the caddy loading/unloading mechanism, record transfer mechanism and turntable drive mechanism. The player control microcomputer 148 has the responsibility for sequencing and controlling the carriage drive mechanism, stylus lifting/lowering mechanism and other player control functions.

During playback, the stylus 52 encounters groove defects which have a tendency to abrade the stylus and the stylus electrode. To protect the delicate stylus electrode 60 (0.2×2.0 micrometers) from damage, it is desirable to locate it on the trailing face of the stylus body. In other words, the motion of a turntable-mounted record 162 is such that the portion of the record beneath the stylus 52 encounters the stylus electrode 60 last in the manner depicted in FIG. 5.

The subject video disc player is provided with a stylus cleaning mechanism 150 in accordance with the principles of the aforementioned Hughes invention. The stylus cleaning mechanism 150 includes a wiping element 152 affixed to a holder 154 which is slidably mounted for motion along a path defined by a pair of guide tracks 156 and 158. The guide tracks 156 and 158 are disposed angularly with respect to the front-to-back carriage path in the manner shown in FIG. 4. The cleaning element 152 can be made from any suitable material like velvet. A return spring secured to the holder 154 biases the holder against an arcuate stop 160. As the carriage 70 is translated to its off-record rest position near the front end of the player, it engages an upstanding, turned-up portion of the holder 154, and drives it away from the record center along the aforesaid angular path. The return spring causes the holder 154 to follow the carriage 70 when it is driven toward the record center for playback until the holder engages the arcuate stop 160.

The player control microcomputer 148 coordinates the activities of the carriage drive motor 140 and the stylus lifting/lowering device 90 to effect stylus cleaning as the carriage 70 is driven toward a turntable-supported record 162 for playback. The control microcomputer 148 issues pulses to the stepper motor 140 until the carriage 70 is advanced to an intermediate point (about 0.30 inches in from the home position) between the home position and a start-of-play position over the record (approximately 1.20 inches inward from the home position). At this point, the stylus lifting/lowering device 90 is energized to lower the stylus 52 onto the stylus wiping pad 152.

The player control microcomputer 148 waits for approximately 1.5 seconds to allow the stylus 52 to come to rest on the stylus cleaning pad 152, and then resumes the carriage drive. As the carriage 70 advances toward the record 172, the cleaning element 152 wipes the stylus tip to rid it from any dust and debris buildup. After the carriage 70 advances another 0.25 inches, the microcomputer 148 sends a command to the stylus lifting/lowering device 90 to raise the stylus 52. When the carriage 70 activates a landing switch, the microcomputer 148 again energizes the stylus lifting/lowering device 90 to gently lower the stylus 52 on a turntable-supported record 162 for playback.

When the stylus 52 reaches its end-of-play position, the player control microcomputer 148 lifts the stylus up, and sends the carriage 70 to its rest position.

To protect the delicate stylus electrode 60 (0.2×2.0 micrometers) during playback, the record is rotated such that the portion of the record beneath the stylus shoe sees the electrode last as previously indicated. Similarly, to protect the stylus electrode 60 during stylus cleaning, it is desirable to wipe the stylus 52 such that the portion of the wiping pad 152 underneath the stylus moves toward the electrode. To this end, the guide tracks 156 and 158 of the wiping pad holder 154 are angularly oriented with respect to the carriage path in the manner shown in FIG. 4.

As previously indicated, whenever a carrier distress situation occurred during play, it is desirable to clean the stylus tip without having to recycle the carriage 70 to and from its off-record rest position. To this end, in accordance with the present invention, a stylus cleaner 200 is located in the carriage arm 70 as shown in FIG. 6. The in-arm stylus cleaner 200 includes a cleaner arm 202, carrying a cleaning element 204, pivotally mounted in the carriage 70 about a vertical pin 206. The cleaner arm 202 is subject to motion, in a plane substantially parallel to the turntable 132, between an advanced position and a retracted position defined, respectively, by the wall of a resonator block 208 and an upstanding post 210 provided in the carriage 70.

The stylus cleaning element 204 comprises a piece of compliant sheet having an edge secured to the cleaner arm 202 such that the sheet extends away from the cleaner arm at substantially right angles to it, as can be seen from FIG. 7. Examples of materials suitable for the wiping element 202 include Butyl rubber, silicone rubber, etc. Illustrative dimensions of the cleaning element 204 are: length=0.175 inches, width=0.115 inches and thickness=0.008 inches. To secure the stylus cleaning element 204 to the cleaner arm 202, the cleaning element is stretched, slid sideways into a slot 212 provided in the cleaner arm, released and then pulled up until it stops against the cleaner arm to adjust the height. The perpendicular orientation of the compliant cleaning element 204 serves to accommodate the full range of the height variation (e.g., due to tolerance stackup) between the stylus 52 disposed in the raised position and the swingably-mounted cleaner arm 202 without the risk of damaging the stylus. The cleaning pad orientation feature of the subject in-arm stylus cleaner 200 is claimed in a concurrently-filed, commonly-assigned U.S. patent application Ser. No. 426,010, of Brauer.

The in-arm stylus cleaner 200 further includes a solenoid 220 comprising an electrical winding 222 disposed about a non-magnetic core 224 and a tubular, slidably-mounted magnetic element 226 disposed in the air gap formed by the non-magnetic core. A coil spring 228 is arranged between one face of the plastic core 224 and a retaining washer 230 disposed on the slidable metal element 226 at one end thereof for biasing the metal element away from the air gap. The metal tube 226 is flared at its other end 232 to hold it in place.

An actuating member 240 has one end 242 hooked into a hole in the cleaner arm 202 and the other end 244 hooked into the hollow metal tube 226 through a hole therein. When the player control microcomputer 148 sends electrical current through the solenoid winding 222, it draws in the slidable element 226, which, in turn, retracts the cleaner arm 202 against the upstanding post 210 in the manner shown in fantom in FIG. 6. When the electrical current is removed from the winding 222, the biasing spring 228 drives the cleaner arm 202 back to its advanced position against the wall of the resonator block 208.

A spring-loaded plunger 246 is reciprocably mounted in the carriage 70 as shown. When the player control microcomputer 148 lifts the stylus 52 up and sends the carriage 70 back at the end of a playback cycle, the front wall of the player pushes the plunger 246 in as the carriage arm arrives at the home position, so that a portion 248 of the plunger engages a vertical portion 250 of the wire form 240 to block accidental retraction of the cleaner arm 202. To protect the delicate stylus electrode 60 (0.2×2.0 micrometers), it is desirable to prevent retraction of the cleaner arm 202 when the stylus 52 is up to avoid wiping of the stylus in a direction from the electrode toward the stylus shoe. When the carriage 70 is advanced toward a turntable-mounted record 162 (e.g., approximately 0.3 inches), a coil spring 252 disposed about the plunger 246 causes the plunger to withdraw to the position shown in FIG. 6 to, in turn, release the actuating member 240.

During playback, the in-arm stylus cleaning sequence is triggered under two circumstances—when the player control microcomputer 148 senses carrier distress for a certain duration of time (e.g., 3 seconds), and when the user operates the PAUSE button 30. When triggered for an in-arm stylus cleaning operation, the control microcomputer 148:

activates the cleaner solenoid 220 while the stylus 52 is down to cock the cleaner arm 202 against the upstanding post 210, operates the lifter electromagnet 94 to raise the stylus 52 to a position against the cartridge stop 64, waits for approximately 0.5 seconds to allow the stylus 52 to arrive at its raised position, releases the sweeper arm 202 to cause the compliant cleaning pad 204 to flick the stylus 52 in the right direction to free it from the dust and debris buildup, and reenergizes the lifter 90 to gently lower the stylus 52 onto the record 162 to resume the playback sequence. (When the in-arm stylus cleaning operation is caused by the activation of the PAUSE button 30, the player control microcomputer 148 waits for reactivation of the PAUSE button to set the stylus 52 back down on the record 162.)

In this particular application, the player control microcomputer 148 simultaneously issues commands to both the cleaner solenoid 220 and the lifter electromagnet 94. But due to the mechanical delays involved, the cleaner 200 responds faster (25 milliseconds) than the lifter 90 (0.25 to 0.5 seconds) to assure that (1) the cleaner arm 202 of fully cocked before the stylus 52 is raised, and (2) that the cleaning pad 204 sweeps the stylus before it is lowered onto the record.

Several variations of the instant in-arm stylus cleaner are possible. For example, the sweeper arm can be normally in the retracted position. In that case, the sequence of events can be:

raise the pickup stylus,
advance the sweeper arm to clean the stylus tip,
lower the stylus, and
retract the sweeper arm to its home position.

The invention described herein presents a group of elements, all of which can be placed within the confines of the carriage arm, for effectively ridding the reproducing stylus of any foreign matter by simply raising it within the carriage, wiping it with a cleaning pad, and then lowering it back down onto the record. This invention may be useful in applications such as digital record players as well as video disc players, and may be equally useful with grooved as well as flat records.

What is claimed is:

1. In a record player including a pickup stylus subject to engagement with a turntable-supported record for recovering prerecorded information disposed thereon during playback; said stylus being mounted at one end of a stylus arm having the other end yieldably supported in a translatable carriage; said player further having means mounted in said carriage for lifting and lowering said stylus in a manner causing said stylus to protrude from said carriage to effect engagement and disengagement of said stylus with a record mounted on said turntable; said player further including a stylus cleaning means mounted in said carriage and comprising a holder carrying a stylus wiping element, and means for causing motion of said holder between a retracted position and an advanced position defining a path traversing said stylus; said player further including a selectively-actuated sequencing means, coupled to said stylus lifting/lowering means and said stylus cleaning means, for retracting said holder along said path in a first non-engaging direction while said stylus is in engagement with a turntable-mounted record to allow said wiping element to pass said stylus without any contact therewith for disengaging said stylus from said turntable-mounted record, and causing said holder to return to said advanced position along said path in a second engaging direction opposite to said first non-engaging direction while said stylus is disengaged from said turntable-mounted record to allow said wiping element to clean said stylus in said second engaging direction.

2. The player as defined in claim 1 wherein said holder is pivotally mounted for motion between said positions.

3. The player in the form of claim 2 wherein said pivotally-mounted holder traverses a plane substantially parallel to said turntable.

4. The player as set forth in claim 1 wherein said motion causing means further comprises means for biasing said holder toward said advanced position, and means for retracting said holder against the force of said biasing means when actuated.

5. The player in the form defined in claim 4 wherein said biasing means comprises a spring.

6. The player set forth in claim 4 wherein said retracting means comprises a solenoid.

* * * * *